United States Patent [19]

Kasper

[11] 3,831,885
[45] Aug. 27, 1974

[54] AIRCRAFT WING WITH VORTEX GENERATION

[76] Inventor: Witold A. Kasper, 1853 132nd Ave. S.E., Bellevue, Wash. 98005

[22] Filed: July 11, 1972

[21] Appl. No.: 270,652

[52] U.S. Cl. ......... 244/40 A, 244/42 D, 244/42 DA
[51] Int. Cl. ..................... B64c 9/28, B64c 23/06
[58] Field of Search ........ 244/40 R, 40 A, 41, 42 R, 244/42 C, 42 CC, 42 D, 42 DA, 42 DC, 45 R, 87, 88, 89, 90 R, 91, 130, 42 DB

[56] References Cited
UNITED STATES PATENTS

| | | | |
|---|---|---|---|
| 2,070,705 | 2/1937 | Barnhart | 244/42 R |
| 2,218,822 | 10/1940 | Joyce | 244/42 D |
| 2,357,465 | 9/1944 | Focht | 244/87 X |
| 2,410,855 | 11/1946 | Koppen | 244/42 D |
| 2,441,694 | 5/1948 | Ehrhardt | 244/40 R |
| 2,445,833 | 7/1948 | Kraemer et al. | 244/42 DB |
| 2,448,966 | 9/1948 | Fales | 244/41 X |
| 3,067,971 | 12/1962 | Dew | 244/42 R X |
| 3,126,173 | 3/1964 | Alvarez-Calderon | 244/42 DB |
| 3,321,157 | 5/1967 | Turner | 244/42 CC |
| 3,438,597 | 4/1969 | Kasper | 244/87 X |

Primary Examiner—Trygve M. Blix
Assistant Examiner—Barry L. Kelmachter
Attorney, Agent, or Firm—Roy E. Mattern, Jr.

[57] ABSTRACT

Tail-less airplanes, such as dsclosed in U. S. Pat. No. 3,438,597 as a stall occurs or is about to occur, may be flown at very high angles of attack to generate favorable spanwise vorte, flows which augment the swept wing profiles creating resultant wing profiles having better lift characteristics, i.e., the vortexes created are lift generating. However, the aircraft is then uncomfortable to be in during such flights at very high angles of attack. Therefore to achieve the benefits of this lift generating vortex flow, without maneuvering such aircraft into a very high angle of attack, the swept wing is equipped with airfoil structures and accessories therefor, which are extended beyond the cruising speed contour of the swept wing, at lower speeds, to create spanwise vortex air flows which selectably enlarge the effective overall airfoil contours as sensed by the passing major air flows. Sustaining aerodynamic lift forces are thereby created at angles of attack well beyond the stall angles of the cruising airfoil contour, and by timely use of such airfoil structures, the vortex air flows are created soon enough for lift generating, so stable flight conditions may be created without so extensively altering the pitch of the landing and/or slow flying tailless aircraft.

4 Claims, 22 Drawing Figures

PATENTED AUG 27 1974 3,831,885

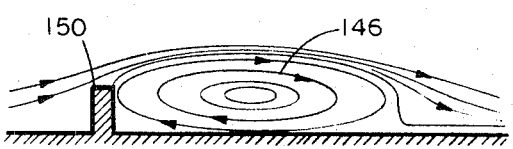
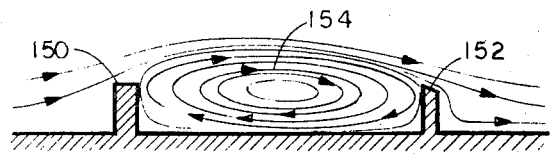
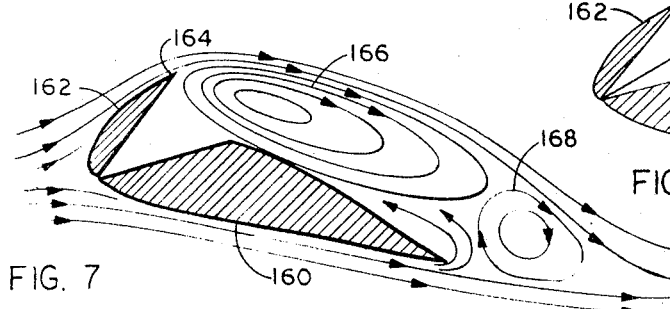
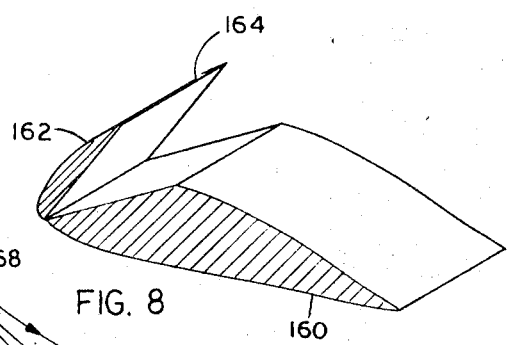
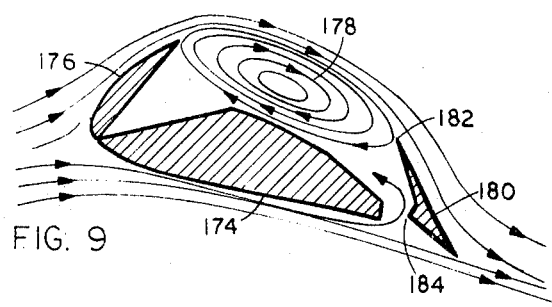
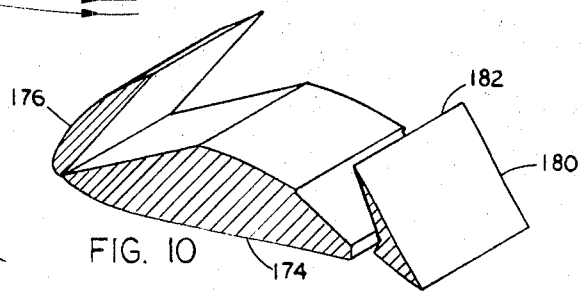
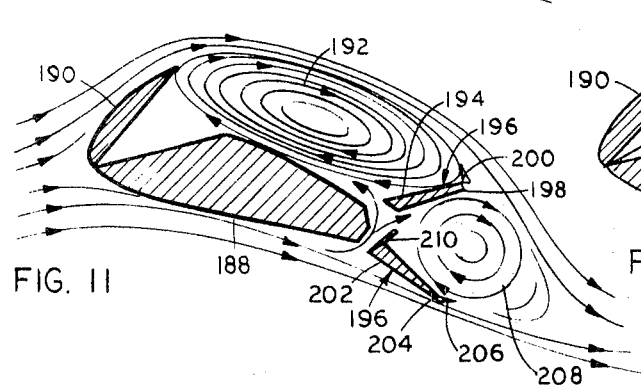
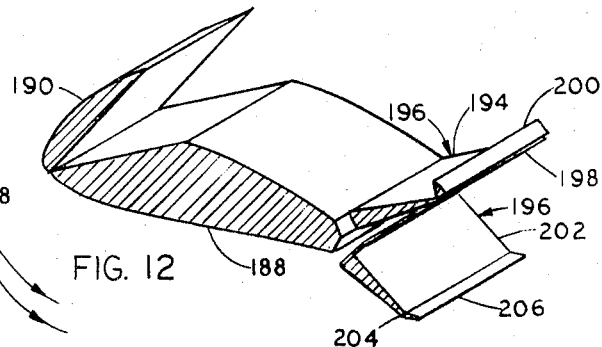
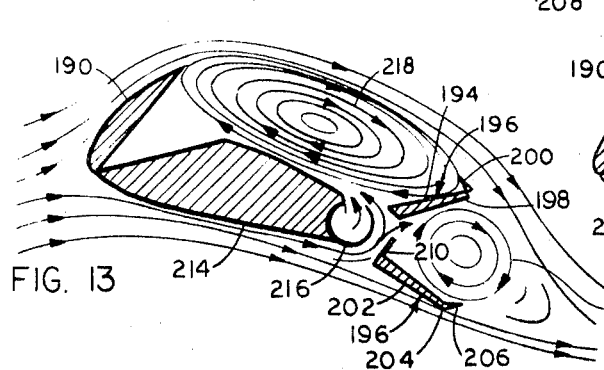
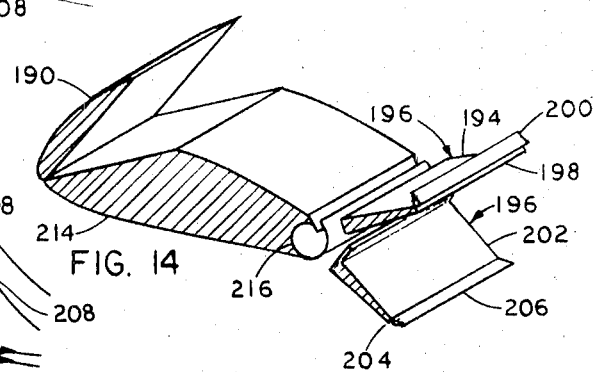

AIRCRAFT WING WITH VORTEX GENERATION

CROSS REFERENCE

The Applicant, Withold A. Kasper, illustrated and described his "Aircraft" in U.S. Pat. No. 3,438,597 which issued on Apr. 15, 1969, and understandings of many structural components and control components of this first aircraft are pertinent to the aircraft illustrated and described herein and such information is so incorporated herein.

BACKGROUND OF INVENTION

In flying his glider embodiment of the aircraft Witold A. Kasper illustrated and described in his U.S. Pat. No. 3,438,597, he observed in flight after reaching and surpassing an angle of attack of 40°, that the air flow reversed immediately adjacent the top surface of the wing. Upon such reversal he was still able to control the flight, flying the glider much in the same way as one mushes in during a parachute flight. Further flights and experimentations using wind flow directional devices indicated the formation of transverse spanwise vortices of air flow. Subsequently, the flights and landings of birds were restudied and observations indicated the possible formation of transverse spanwise vortices of air flow on their wings.

As a consequence of the glider flying experience and the continued observation of birds flying slowly and landing, new wing designs, changeable in flight, were undertaken by him to create and maintain transverse spanwise vortices of air flow. After these vortices were generated, safe flight operations were undertaken well under stall speeds normally associated with fixed configurations of wings in their cruising crossectional forms. When the new swept wing designs were changed in flight, the overall aircraft did not have to be flown at such a high pitch attitude at the lower speeds and at and under stall speeds to create and maintain the favorable transverse spanwise vortices of air flow.

Essentially during such favorable attitude of the aircraft at lower angles of attack with the swept wing airfoil structures adjusted for flight beyond normal stall, the created transverse spanwise vortices of airflows effectively changed the overall wing configuration sensed by the entire surrounding and passing airflow. The changed wing form plus the vortex air flow created an effective wing of large profile or cross section in a form suitable for creating sufficient lift to permit a well controlled and safe descent to the ground.

This flight result occurring open creation of the spanwise vortices has been compared, by analogy, in reference to the magnus effect and explained to some extent using the associated studies and formulaes. After continued experimentation, different types of changing wing structures are now used to start, maintain, and control spanwise vortices to create the resultant overall wing profiles which produce the needed lift forces during slow and/or landing flight periods.

Also during these earlier flights at high angles of attack, it was realized that air discharging from vortexes was being directed past rudders and elevons. However, a need remained for more effective aerodynamic flight controls. Therefore, in the aircraft illustrated herein, the stabilizer and rudder control surfaces at the wing tips were slanted to create additional directional air flow force components. Moreover, elevons were equipped with tabs which moved to make their control effectiveness equally sensitive and responsive whether the elevon was pivoted upwardly or downwardly. By using tabs, drag is minimized on the depressed elevon and drag is increased on the raised elevon, thereby avoiding any unwanted yaw condition.

SUMMARY OF INVENTION

Aircraft, such as disclosed in U.S. Pat. No. 3,438,597 and modified as disclosed herein are flown safely, comfortably, reliably, and effectively, at many operating speeds and particularly at very low speeds, even as a normal stall is about to occur or after a normal stall has occurred. At the near normal stall, stall and/or under stall speeds, the airfoil structures selectively and especially provided in a sweep wing are extended beyond the cruising speed contour of the swept wing. When so extended, they create and control transverse spanwise vortex air flows, one on each side of the aircraft, with each vortex discharging over the wing tip flight control surfaces. The spanwise vortex air flows enlarge the effective overall airfoil controus as sensed by the passing major air flows, thereby creating sustaining aerodynamic lift forces at angles of attack just beyond and well beyond the stall angles of a cruising airfoil contour swept wing.

These extendable airfoil structures of the swept wing include: leading edge airfoil structures mounted so their trailing edges are pivoted upwardly; trailing edge airfoil structures mounted so their leading edges or trailing edges are pivoted upwardly; and/or trailing edge airfoil structures, one above the other, separable into two trailing edge airfoil structures, the one above pivoting upwardly at its trailing edge and the one below pivoting downwardly at its trailing edge.

Accessories used with these extendable airfoil structures include actuators, linkages and auxiliary air distribution systems for selectively injecting supplemental air flows to enhance, control, and maintain the transverse spanwise vortex air flows. Such extendable airfoil structures with their accessories effectively create the greater lift overall airfoil flow patterns enlarged by the vortex formations, without reliance on or in lieu of nearly continuous skin airflow extended structures. As a consequence, this very desirable slow speed flying capability is obtained without substantially increasing the weight of the aircraft, by the otherwise addable amount of the weight to be attributed to such nearly continuous fully extended airfoil structures and their more elaborate and extensive actuators.

In providing this aircraft capable of such safe slow flying speeds, additional improvements in control surfaces are included. Each vertical stabilizer and each rudder at each wing tip of the swept wings are slantably mounted. Each rudder is mounted on a hinge having a hinge line which is slanted outwardly and rearwardly from bottom to top. In such slanted positions these air flow control structures create air flow force components which are especially beneficial in controlling the very slow flying aircraft.

Also to equalize the sensitivity of upward and downward control movements of the elevons, each one is equipped with an airfoil tab which beyond a neutral cruise position, always pivots upwardly. As the elevon is pivoted upwardly, the combination of elevon and this tab becomes more effective overall, and as the elevon is pivoted downwardly, this same combination of elevon and tab becomes less effective overall than the elevon per se would have been, and may initially noticeable yaw drag effects are thereby eliminated.

DRAWINGS OF PREFERRED EMBODIMENT

Figure 1:
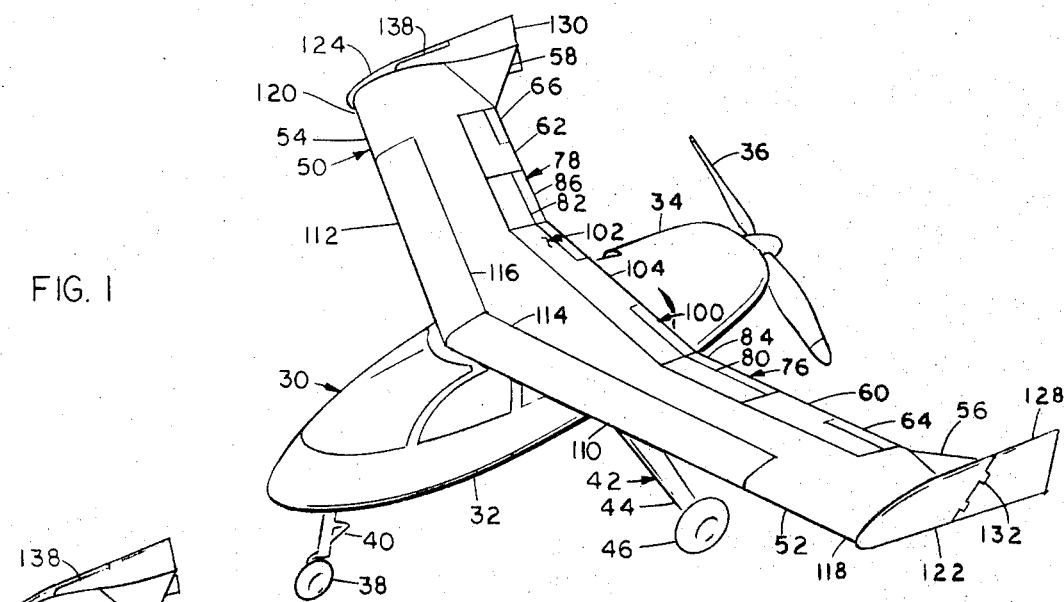
FIG. 1 is a perspective view of the aircraft at rest, with all the directional control airfoils and vortex generating and control airfoils in their neutral positions.
Figure 2:
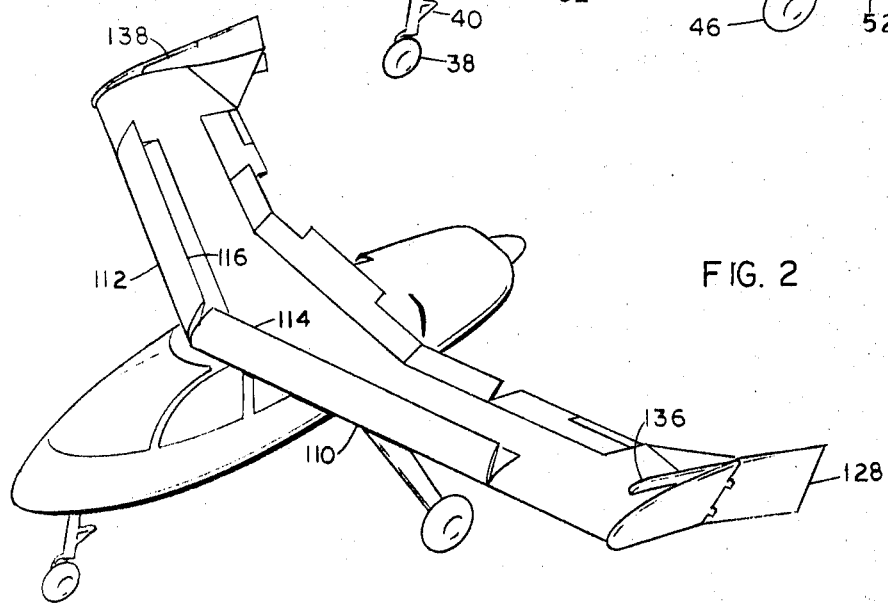
FIG. 2 is a perspective view of the aircraft in flight, with a left rudder airfoil in its left turn producing position and the balance of the directional control airfoils retained in their neutral position, and the vortex generating and control airfoils in their active positions generating and controlling transverse spanwise vortexes.
Figure 3:
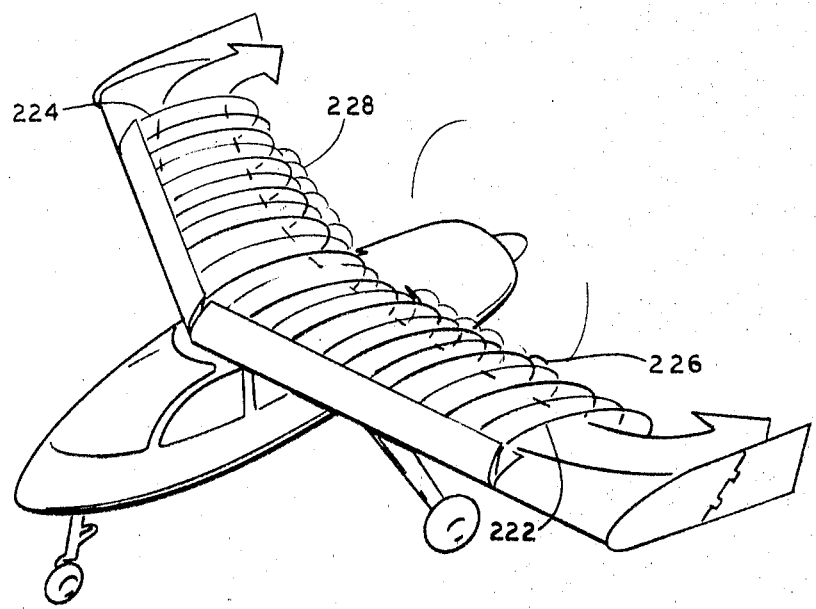
Figure 15:
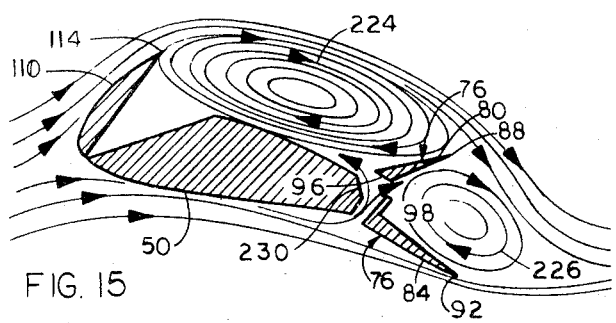
Figure 16:
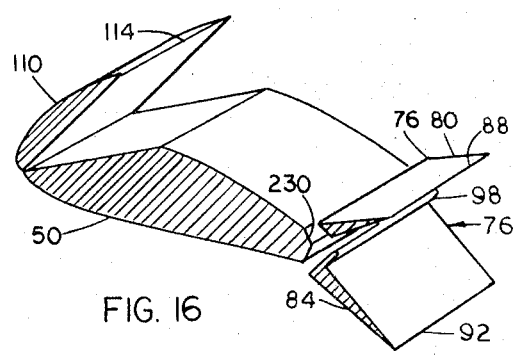
Figure 17:
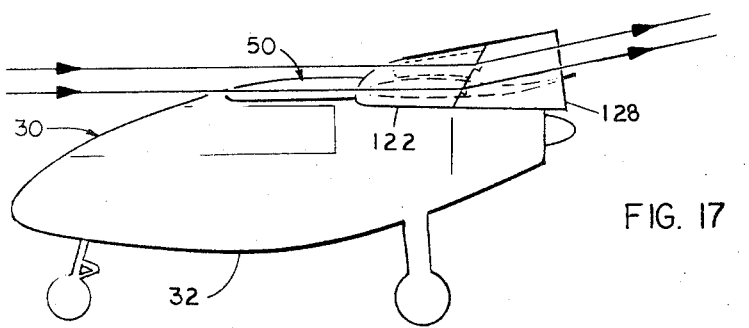
Figure 18:
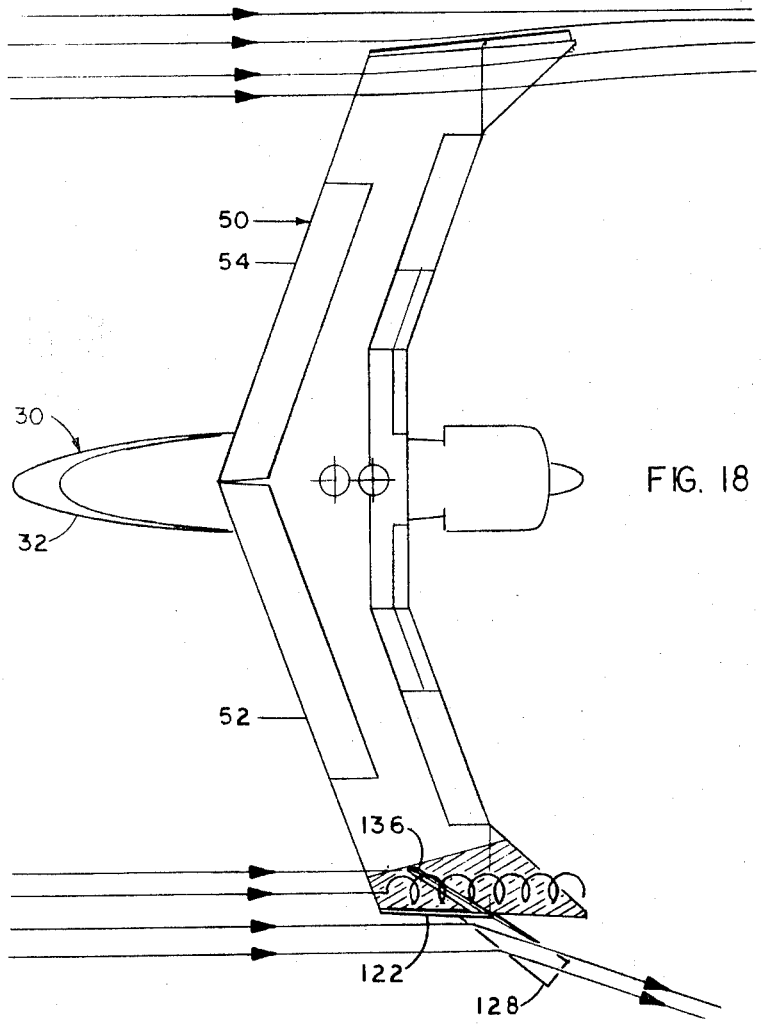
Figure 19:
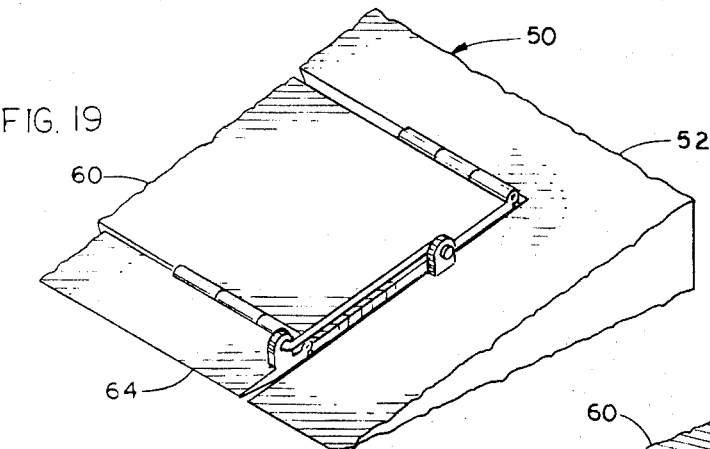
Figure 20:
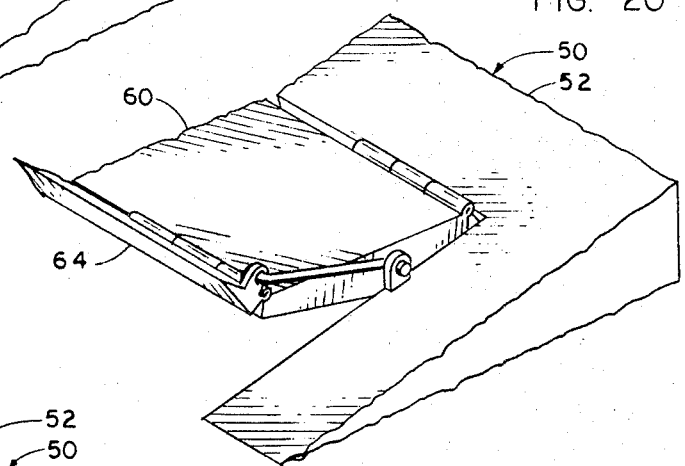
Figure 21:
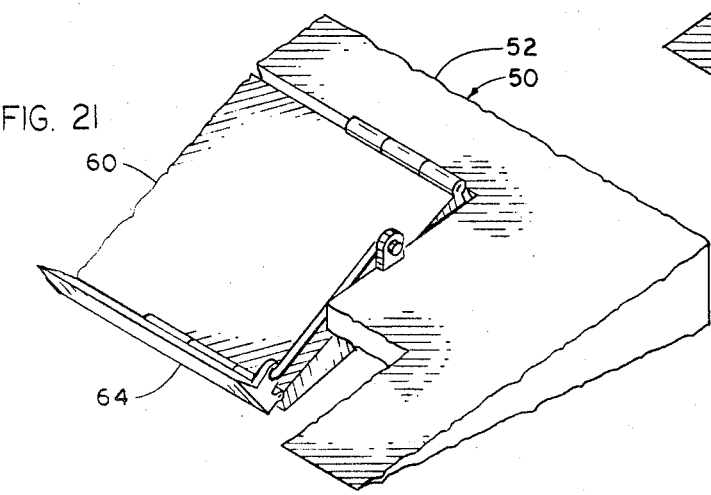
Figure 22:
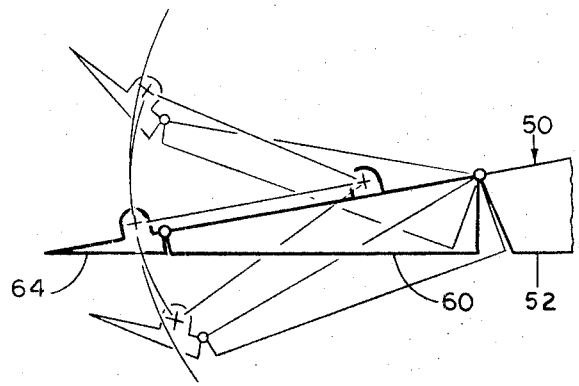

FIG. 3 is a perspective view of the aircraft in flight, with all the directional control airfoils in their neutral positions, and the vortex generating and control airfoils in their active positions generating and controlling transverse spanwise vortexes, with light curved lines indicating the circular motion of the air traveling in the vortex and with directional arrows indicating the air leaving the vortexes at the respective swept wing tips;

FIGS. 4, 5, and 6 are schematic sectional views of a transverse spanwise vortex to illustrate, respectively: in FIG. 4, a simple vortex; in FIG. 5, a step induced vortex which varies in size as gusts occur and as the step is varied in its height; and in FIG. 6, a confined vortex which is located between an inducing step and a shaving barrier is kept relatively unaffected by gusts and its center of pressure location remains relatively stable;

FIGS. 7 and 8, respectively in section and in perspective, with vortex air flow indicating lines being used in FIG. 7, illustrate how a wing is equipped with a leading edge airfoil structure which is pivoted upwardly at its trailing edge to become a step, thereby creating a lift vortex, as previously indicated in the schematic sectional views in FIGS. 4 and 5, and also creating a drag vortex beyond the trailing edge of the wing;

FIGS. 9 and 10, respectively in section and in perspective, with vortex air flow indicating lines being used in FIG. 9, illustrate how a wing is equipped with a leading edge airfoil structure which is pivoted upwardly at its trailing edge to become a step, thereby creating a lift vortex, and with a trailing edge airfoil structure which is pivoted upwardly at its leading edge to become a vortex shaving barrier above to keep the lift vortex within stable limits and to become an entry below for air to beneficially circulate into the transverse spanwise lift vortex;

FIGS. 11 and 12, respectively in section and in perspective, with vortex air flow indicating lines being used in FIG. 11, illustrate how a wing is equipped with a leading edge airfoil structure which is pivoted upwardly at its trailing edge to become a step, thereby creating a lift vortex, and with two trailing edge airfoil structures, one above the other, the one above pivoting upwardly to place its trailing edge as a vortex shaving barrier, and the one below pivoting downwardly to provide an entry below for air to beneficially circulate into the transverse spanwise lift vortex, and also to provide a following space in conjunction with the above trailing edge airfoil structure in which a drag producing vortex is generated with the assist of this above airfoil structure serving as a step as it continues to serve also as the shaving barrier, the trailing edge airfoil above having its leading edge beveled, and the trailing edge airfoil below having its leading edge equipped with an upstanding air flow guiding flange, which both serve to better direct the airflow coming in from below to enhance the air flows in both the lift and drag vortexes, and, as necessary, to further control the shaving of the respective vortexes, the above and below trailing edge airfoil structures include tabs;

FIGS. 13 and 14, respectively in section and in perspective, with vortex air flow indicating lines being used in FIG. 13, illustrate how a wing equipped with all the airfoil structures illustrated in FIGS. 11 and 12, is further equipped with transverse spanwise air conduits to bring air under pressure substantially throughout a wing to feed vortexes, such as the lift vortexes;

FIGS. 15 and 16, respectively in section and in perspective, with vortex air flow indicating lines being used in FIG. 15, illustrate how a wing is equipped with a leading edge airfoil structure which is pivoted upwardly at its trailing edge to become a step, thereby creating a lift vortex, and with two trailing edge airfoil structures, one above the other, the one above being shorter and pivoting upwardly to place its trailing edge as a vortex shaving barrier, and the one below being longer and pivoting downwardly to provide an entry below for air to beneficially circulate into the transverse spanwise lift vortex, and also to provide a following space in conjunction with the above trailing edge airfoil structure in which a drag producing vortex is generated, with the assist of this above airfoil structure serving as a step as it continues also to serve as the shaving barrier, the trailing edge airfoil above having its leading edge beveled, and the trailing edge airfoil below having its leading edge equipped with an upstanding air flow guiding flange, which both serve to better direct the airflow coming in from below to enhance the air flows in both the lift and drag vortexes;

FIG. 17 is a side view of the aircraft indicating with arrows and air flow lines how the slantably mounted rudder deflects air upwardly and outwardly, as it is pivoted about its hinge mounted at the angle shown;

FIG. 18 is a top view of the aircraft indicating at the right wing tip with air flow lines, how the right or starboard near vertical stabilizer and rudder are pointed inwardly and yet tilted or slanted outwardly at their tops at their near straightaway cruise operating positions, and indicating at the left wing tip with arrows and air flow lines, how the left or port near vertical stabilizer is pointed inwardly and yet tilted or slanted outwardly at its top, and how the left or port rudder pivots outwardly beyond its slanted hinge mounting to effectively redirect the oncoming air to create the reactive turning component of the aerodynamic force, and also how it pivots inwardly forward of its slanted hinge mounting so its balance portion also act as a spoiler of the air flow over the wing tip inclusive of the horizontal stabilizer; and FIGS. 19, 20, 21 and 22 illustrate, in partial views, perspective and side, how a control surface such as the elevon is equipped with a unidirectional tab and its linkages to make the feed back sensitivity and the effective control comparable for like arcuate deflections of the elevon either above or below the normal cruising contour of the wing, with FIG. 19 showing the cruise position, FIG. 20 the elevon up position wherein the tab enhances the effectiveness of the combined elevon and tab, FIG. 21 the elevon down position wherein the tab decreases the effectiveness of the combined elevon and tab, and FIG. 22 the respective major alternate positions of the elevon and the tab wherein the tab pivots in the same direction whether the elevon pivots upwardly or downwardly, the faired or generally cruise position being shown in solid lines and the up and down elevon positions being shown in dotted lines.

DESCRIPTION OF PREFERRED EMBODIMENT

1. General Introduction

In flying his aircraft as disclosed in U.S. Pat. No. 3,438,597, Witold A. Kasper, at extreme angles of attack found it still controllable yet his positioning was unconfortable. Subsequently, the aircraft which he discloses herein, was developed to fly at these very low speeds, experienced by him previously at the extreme angles of attack, while still maintaining an angle of attack wherein his positioning is comfortable. All this is done without detracting from the higher speed, cruise, landing and/or take off flight advantages realized during flights of his aircraft disclosed in his U.S. Pat. No. 3,438,597, wherein the control surfaces were mounted on the swept back wing and no extending fuselage portions were needed to support any control surfaces.

His former aircraft, flyable at all times without any need from centerline located tail control surfaces, at these high angle of attacks created transverse spanwise vortexes which he observed as sustaining his slow but controllable flight well beyond angles of attack, previously and normally thought to indicate the loss of all controllable lift and/or the loss of immediate overall control of an aircraft. With this flight information coupled with the restudy of many vortices, and the restudy of many birds in their flight, inclusive of their take off and landing, Withold A. Kasper now has a new aircraft which flies extremely well throughout all reasonable speeds of flight and also at lower speeds previously considered to be unsafe, being below the previously designated normal stall speeds. To enhance his control over the aircraft at speeds below these normal stall speeds, he has mounted the near vertical stabilizers and rudders at a slant, with the rudder turning on its slanted hinge line to create a reactive air flow dynamic control component which is especially useful in the slow mushing in type flight of the aircraft. Also he has used a unidirectional tab on the elevons to make them comparatively responsive, both in control and sensitivity, whether moved upwardly or downwardly, avoiding any yaw drag effects.

2. General Configuration of Aircraft

As observed in FIGS. 1, 2, 3, 17 and 18, the aircraft 30, has a compact fuselage 32, not requiring a rearward extension solely to position any control surfaces. An engine 34 and its propeller 36 are mounted at the rear of the fuselage 32. A nose wheel 38 and its support 40 are positioned at the front of the fuselage 32. Somewhat beyond the center of the fuselage 32, the main landing gear 42 has a continuous U-shaped support 44 secured to it to position the other landing wheels 46, completing the three wheel support of the aircraft 30.

The swept wing 50 is secured to the top of fuselage 32 and positioned without any dihedral angle. Each entire left or port section 52 and each entire right or starboard section 54 are identical and the port and starboard sections are mirror images of one another.

Throughout the wing 50, airfoil structures are movable beyond the cruise control configuration. At each wing tip and trailing behind are horizontal stabilizers 56, 58. Just inboard of them are elevons 60, 62, each having a unidirectional tab 64, 66.

Farther inboard are split flaps 76, 78, having trailing airfoil structures 80, 82 located above and trailing airfoil structures 84, 86 located below, which respectively are pivoted so their above trailing edges 88, 90 raise and their lower trailing edges 92, 94, lower. The trailing airfoil structures 80 and 82 located above on the split flaps 76, 78, each have a lower slanted front portion 96. Also the trailing airfoil structures 84, 86 located below each have an upstanding structure 98 at their front portions.

Again, farther inboard are additional split flap assemblies 100, 102 of like components. However as the fuselage 32 is approached the downward motion of the airfoil 104 so located is restricted and therefore it is not a split flap assembly, instead being a single airfoil raised on occasions to serve as a spoiler and to shave the lift vortex.

Along the leading portions of each side section 52, 54, of the swept wing 50, are airfoil structures 100, 112 pivotally mounted so their trailing edges 114, 116, raise. They are positioned as nose flaps would be; however, vortex generation is their purpose when pivoted well beyond the cruise contour of the swept wing 50.

At each wing tip 118, 120, the near vertical stabilizers 122, 124 mounted there are pointed longitudinally inwardly at their forward ends and also are secured in a transversely and outwardly slanted position at their tops. Continuing in this same orientation are the rudders 128, 130 when in their straight away faired or normal cruise configuration. They are mounted on hinges which are slanted again and they only swing outwardly. However, their balance portions 136, 138 swing inwardly over the wing tips 118, 120 to also serve as spoilers.

The many internal linkages, actuators, and power sources utilized in flying this aircraft 30 are principally considered to be derived from conventional products and systems. For clarity of the presentation of the major aspects of this aircraft 30, they therefore are not discussed.

3. Generation of a Vortex to Create Lift

After Witold A. Kasper observed wing secured indicators following air flow patterns transversely spanwise across the wing of his aircraft, he concluded that such a spanwise vortex existed. He therefore generated such a vortex in flight, without reaching such a high angle of attack, in the aircraft disclosed herein by operating many airflow structures.

To better understand the respective purposes of these airflow structures, the schematic FIGS. 4, 5, and 6 show in cross section the generation of different vortexes where the source air is coming in tangentially at the outer boundaries and the discharge air is leaving axially, the latter being indicated by arrows and flow lines in FIG. 3. In FIGS. 4 and 5 simple vortexes 144, 146 are formed behind respective obstructions 148, 150. Gusts are known to effectively reduce or stop them. Therefore in addition to regulating the height of the obstructions, such as step 150, which aid in the generation of a vortex 146, a shaving or sizing barrier or step 152 is often used as shown in FIG. 6 to confine the location, size, and center of pressure of a vortex 154. Following the presentations of these schematic FIGS. 4, 5, and 6, their application to the airfoils shown in the following figures is better understood.

Although the aircraft 30 illustrated and described herein embodies the wing 50 and its airfoils indicated in FIGS. 15 and 16, the other wings illustrated are used to meet different operating specifications and cost objectives. For example the basic approach to generating the vortex is undertaken by using the wing 160 having a leading airfoil 162 pivoted so the trailing edge 164 thereof raises as it is positioned as shown in FIGS. 7 and 8 to create the lift vortex 166. Also a second vortex is generated and referred to as the drag vortex 168, to distinguish it from the lift vortex 166. As indicated by the air flow lines these two vortexes 166, 168 combine to create an effective cross sectional profile of a much larger wing which has better lift characteristics at these lower aircraft speeds. This vortex defined larger wing 160 is acquired by adding only a small portion of the weight that would otherwise be required if this enlarged profile were to be established completely by adding only a small portion of the weight that would otherwise be required if this enlarged profile were to be established completely by airfoil structures and their expanding actuators.

In FIGS. 9 and 10, wing 174 has a leading airfoil 176 pivoted to create the lift vortex 178 which is both shaved and fed by a trailing airfoil 180 having its leading edge 182 pivoted upwardly for the shaving function. The lower surface 184 of airfoil 180 redirects air from below the wing 174 to the bottom of the vortex 178 above. Generally in this arrangement a drag vortex does not form.

In FIGS. 11 and 12, wing 188 has a leading airfoil 190 creating the lift vortex 192 and it is shaved and controlled by trailing airfoil structure 194 arranged above on a split flap 196. The trailing edge 198 of airfoil structure 194 pivots upwardly and its effectiveness may be enhanced by a tap 200 which also acts as a shaving device. The trailing airfoil structure 202 arranged below on the split flap 196 pivots to move its trailing edge 204 downwardly and its effectiveness is enhanced by a tap 206 which also acts as a shaving device with respect to the drag vortex 208. This drag vortex 208 is created upon the separation of the trailing edges 198 and 204. Both the lift vortex 192 and this drag vortex 208 are further controlled both by the upstanding structure or step 210 on trailing airfoil structure below 202 and by the slanted portion 212 on the trailing airfoil structure above 194. Also the wing 188 has a slanted surface structure 214 to aid in guiding air flowing from below the wing up and into the bottom of the lift vortex 192. The overall wing profile created by operating all these airfoil structures to establish vortexes 192 and 208, is very large creating an effective wing of very high lift characteristics.

In FIGS. 13 and 14, all the same airfoil structures are used. However, in this wing 214 a transverse spanwise tube 216 filled with compressed air distributes this air to feed the lift vortex 218 either at all times or at selected times. With this capability slower flying speeds are undertaken.

In FIGS. 15 and 16, the wing 50 of aircraft 30 is shown. It has a leading airfoil 110 creating the lift vortex 222. Also trailing split flap 76 is used to create a drag vortex 226. This occurs as the trailing edge 88 of the trailing airfoil structure 80 arranged above is pivoted upwardly to serve both as a shaving barrier for controlling the lift vortex 222 and as a step for creating the drag vortex 226. Further confinement and control of the drag vortex 226 occurs as the trailing edge 92 of trailing airfoil structure 84 arranged below is pivoted downwardly. At the leading edge of this lower trailing airfoil structure 84, an upstanding guidance structure 98 is secured to direct air coming from below the wing 50 both back into the bottom of lift vortex 222 and on into the drag vortex 226. Also to better guide the air, the wing 50 has a slanted surface structure 230 opposite guidance structure 98.

4. Flight Control Airfoils to Aid Piloting During Slower Flying Speeds When Vortexes Are Being Generated The capability of the flight control airfoils disclosed in U.S. Pat. No. 3,438,597 are further enhanced, as illustrated in FIGS. 17 and 18. In their straight away faired or cruise position the rudders 126, 130 with their balance portions 136, 138 are in alignment as before with the near vertical stabilizers 122, 124. Then in addition to being pointed inwardly as before, this entire group is transversely and outwardly slanted at its tops. Moreover, the hinges 132 of the rudders 128, 130 are mounted on still another slant so upon deflection of a rudder, on coming air is redirected upwardly and outwardly as shown by the flow lines and arrows illustrated in FIGS. 17 and 18.

Also as illustrated in FIGS. 19, 20, 21 and 22, the elevons 60, 62 are equipped with unidirectional tabs 64, 66. The left side 52 of the wing 50 is shown in these figures wherein in FIG. 19, the faired and normal cruise position is illustrated. In FIG. 20, the elevon 60 has been pivoted upwardly and the unidirectional tab 64 has pivoted in the same rotational direction as the elevon 60 to enhance the overall effectiveness of their combination. In FIG. 21, the elevon 60 has been pivoted downwardly whereas the unidirectional tab 64 continues to pivot upwardly to reduce the overall effectiveness of their combination. The scope of overall travel of the elevon 60 and its tab 64 is shown in FIG. 22. By using these unidirection tabs 64, 66 the elevons 60, 62 are comparably effective and responsive when moved either upwardly or downwardly in relation to corresponding degrees of elevon control movements, avoiding yaw drag.

These improvements in controls over those controls previously set forth in U.S. Pat. No. 3,438,597 aid in the piloting of the aircraft 30 throughout all flight stages but they are particularly helpful at the very slow flying speeds.

For example, in resect to the slanted or canted mounting or positioning of the near vertical stabilizers 122, 124 and the rudders 128, 130, a dihedral effect is supplied. Also during a steep decent with the aircraft 30 remaining level or near level, the slanted vertical stabilizers 122, 124, and the rudders 128, 130, create resultant control forces as air is deflected by them. When either rudder 128 or 130 is deflected it is effective about at least two motion axes of the aircraft 30.

5. Use of Vortex Discharge to Direct Air Over the Flight Control Surfaces Located at and Near the Wing Tip Trailing Edges In FIG. 3, the cumulative effect of the transverse spanwise radially fed lift vortexes 222, 224 and the transverse spanwise radially fed drag vortexes 226, 228, is shown by both the overall radial air flow indicating lines and the resultant axial air out flow indicating flow lines arranged to present large directional arrows. The latter arrows are curved rearwardly to indicate how the near vertical stabilizers 122, 124, and the rudders 128, 130 together with the normal overall air flow passing by the wings redirect the axially discharging air from all the vortexes. As redirected the discharging vortex air passes directly over the wing tip flight control surfaces: elevons 60, 62, horizontal stabilizers 56, 58, and the rudders 128, 130.

As a consequence at slower speeds when lift from the vortexes 222, 224 is being relied upon, the air passing over these wing tip controls is furnished by both the axial discharge air from the vortexes and from the normal overall air flow passing by the wings. When the forward speed diminishes so the normal overall air flow is minimal or nonexistent, the air discharged from the vortexes continues to flow by these wing tip control surfaces so they remain effective.

6. Summary of Some Flight Control Surface Movements to Obtain Different Flight Directions and Attitudes In U.S. Pat. No. 3,438,597 many of the flight characteristics are given and none are withdrawn with respect to aircraft 30. However, to supplement those flight characteristics descriptions, it is now to be remembered that the slant or canted mountings of the near vertical stabilizers 122, 124 and rudders 128, 130, provide the added control at very low speeds and especially during decent as the aircraft remains level or nearly so.

Also at anytime during all flight speeds, the canted or slanted rudders 128, 130, with their canted hinges 132, when defleted create a side force as well as a down force. The side force for turning is the primary function. However this down force, being applied back of the center of gravity, results in a beneficial pitch up reaction which prevents altitudes losses during a turn.

This rudder 128 movement, as before, places the balance portion 136 of a rudder over the wing to serve as spoiler. The change in the effective lift moves the center of lift forward or pressure forward supplementing the pitch up action generated by the deflection of rudder 128 as just discussed. Also this inward movement of the balance portion 136 of rudder 128 creates a drag generating a yaw reaction which is beneficial with respect to turning the aircraft 30. So, as before, all the movements of most control surfaces are additive to each other and often effective in a dual way to aid in piloting the aircraft 30.

At times as flight continues when lift vortexes are formed, the flow of air over and near the top surface of the wing is flowing in the space where previously the air was flowing in the opposite direction at the higher speeds of the aircraft. Therefore there is an elimination of the drag previously existing at this locale and whatever new drag is formed in other locations does not seem to match it, so a performance gain is realized as the overall drag is reduced.

I claim:

1. A wing for an aircraft comprising a main air foil member, a first flap structure pivotally secured to the leading edge of said member for swinging movement between a first position in which its outer surface forms a smooth continuation of the upper surface of said main member and a second position in which the trailing edge of said flap structure is disposed a substantial distance above the upper surface of said main member, said flap structure being so mounted on said main member as to prevent flow of air between said flap structure and said main member when said flap occupies said second position, whereby a lift generating vortex will be formed adjacent the upper surface of said main member rearwardly of said flap structure, and second flap structure pivotally secured to said main member adjacent the trailing edge thereof, said second flap structure being movable between a first position in which it forms a smooth continuation of the trailing surface of said main member and a second position in which it is inclined with respect to the surface of said main member, to dispose a portion of said second flap structure a substantial distance above the upper surface of said main member, and said second flap structure is spaced rearwardly of the trailing edge of said main member to provide a slot for air to flow from the lower surface of said main member upwardly around the trailing edge of said main member and forwardly into said vortex.

2. A wing according to claim 1 wherein said main air foil member is swept back at opposite sides of a center line and wherein said first and second flap structures each include a pair of flaps, each flap extending outwardly from the region of said center line toward the tip of said main air foil member.

3. The wing according to claim 2 wherein said second flap structure at each side of said center line comprises a pair of flaps, one of said pair of flaps being mounted for movement upwardly of said main air foil member and the other flap being mounted for movement downwardly of said main air foil member.

4. The wing according to claim 1 together with a duct system in said main air foil member for supplying air to said vortex.

\* \* \* \* \*